United States Patent [19]

Peppel et al.

[11] Patent Number: 4,655,433

[45] Date of Patent: Apr. 7, 1987

[54] RISER TENSIONING SYSTEM

[75] Inventors: George W. Peppel, Arlington; Paul E. Sullivan, Bedford, both of Tex.

[73] Assignee: Lockheed Corporation, Calabasas, Calif.

[21] Appl. No.: 767,349

[22] Filed: Aug. 20, 1985

[51] Int. Cl.[4] .................. B63B 21/16; B65H 75/48; B66D 1/14; F16F 1/48

[52] U.S. Cl. ................................ 254/364; 114/230; 242/107.3; 242/107.5; 254/374; 267/57.1 R; 267/140.4

[58] Field of Search ............... 254/268, 329, 364, 374, 254/375; 114/230, 247, 254; 242/75.3, 107, 107.3, 107.5; 267/57.1 R, 57.1 A, 140.4, 141.1, 153, 154

[56] References Cited

U.S. PATENT DOCUMENTS

| | | | |
|---|---|---|---|
| Re. 30,842 | 1/1982 | Speer | 474/135 |
| 2,051,735 | 8/1936 | Michelson | 242/107.11 |
| 2,152,969 | 4/1939 | Nash | 254/364 X |
| 2,167,508 | 7/1939 | Herold | 248/575 X |
| 2,203,342 | 6/1940 | Sloman et al. | 267/57.1 A |
| 2,939,680 | 6/1960 | Powell | 254/364 X |
| 3,075,724 | 1/1963 | Stahmer | 254/374 X |
| 3,743,249 | 7/1973 | van Daalen | 254/374 X |
| 4,057,219 | 11/1977 | Sobolewski | 254/364 X |
| 4,108,508 | 8/1978 | Clinard | 267/57.1 R X |

*Primary Examiner*—Stuart S. Levy
*Assistant Examiner*—Joseph J. Hail, III
*Attorney, Agent, or Firm*—Stanley L. Tate

[57] ABSTRACT

A tensioner (10) is disclosed for use in tensioning connecting lines (16) connecting a marine riser (14) to a floating platform (12). The tensioner (10) is a passive system which incorporates a series of cylindrical elastomeric members (42, 54, 60) which are deformed in torsion to exert the proper tension on the connecting line (16). A specially tapered drum (30) is provided on the tensioner so that the radial distance from the axis of rotation of the drum to the position where the line leaves the drum varies to compensate for the variation in torsional moment of the elastomeric members so that a predetermined tension can be maintained on the line (16) as the line is payed out and taken in from the tapered drum.

8 Claims, 7 Drawing Figures

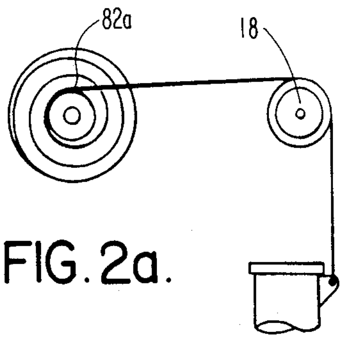
FIG. 2a.
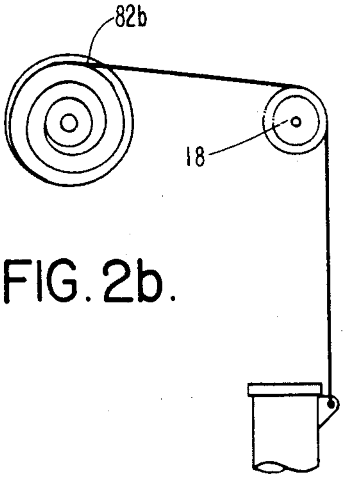
FIG. 2b.
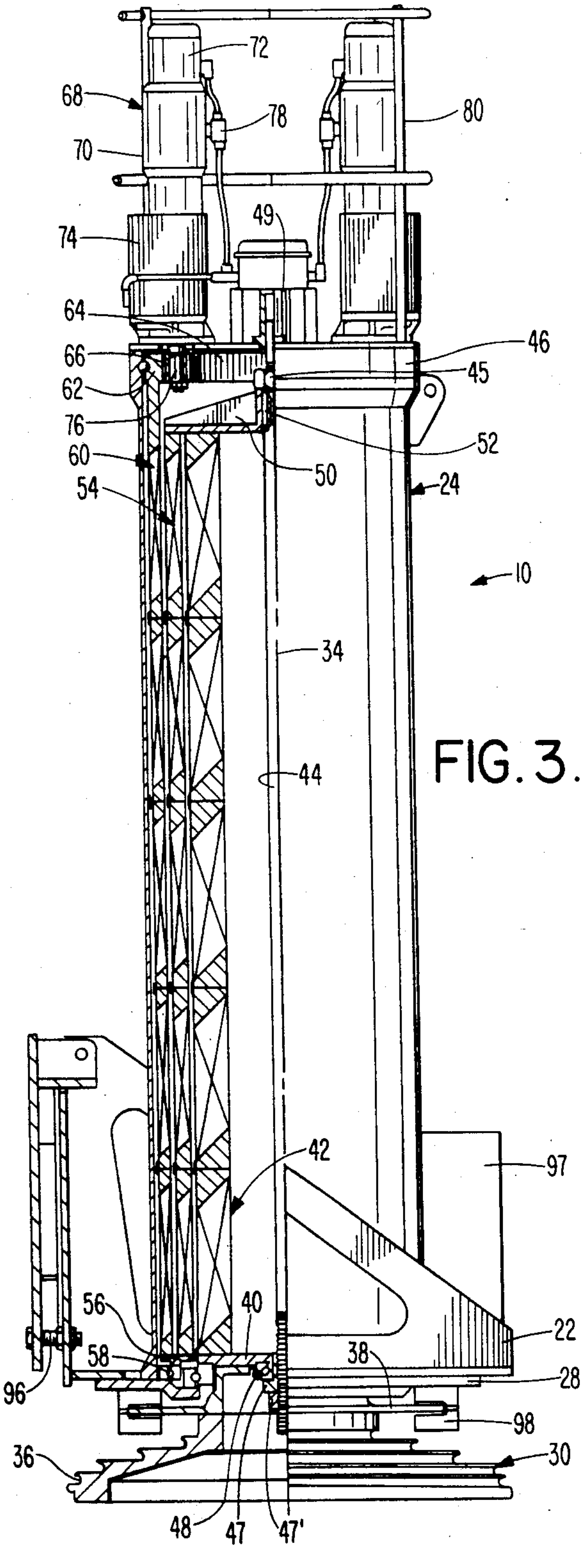
FIG. 3.
FIG. 4.
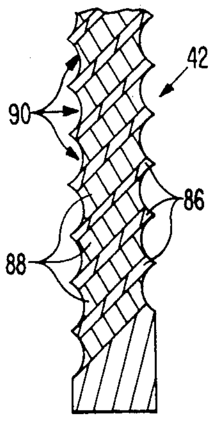
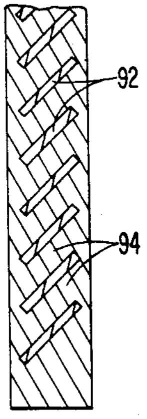
FIG. 5.

RISER TENSIONING SYSTEM

TECHNICAL FIELD

This invention relates to offshore drilling and production, and in particular to a system for maintaining a relatively constant tension in the connecting lines extending between a marine riser and a floating drilling or production platform.

BACKGROUND ART

Offshore oil drilling has become a critical factor in supplying present day energy requirements. Offshore drilling is a relatively recent development and has seen great advances in recent years. One highly regarded technique for offshore drilling employs the use of a floating drilling platform which floats on the sea surface. A marine riser extends from the drilling site on the sea floor to a position near the surface. The riser is then connected to the floating platform by a series of connecting lines or cables.

These connecting lines must provide the force necessary to support the marine riser in a near vertical orientation. However, the riser essentially remains fixed relative to the sea floor while the floating platform will rise and fall and move horizontally under the influence of the movement of the ocean surface. Some provision must be made to permit these connecting lines to compensate for the relative motion between the marine riser and the floating platform while maintaining the necessary force to support the marine riser.

In the past, hydropneumatic systems have been mounted on the floating platform and used to pay out or take in the connecting lines while maintaining the necessary tension in the lines. The hydropneumatic systems operate by connecting the line to a piston moving within a cylinder. The piston is permitted to travel the length of the cylinder, while maintaining a predetermined hydraulic or pneumatic pressure on the piston to tension the line.

All of the previous hydropneumatic systems have been active systems. This means that there must be a constant movement of pressurized air or hydraulic fluid as the floating platform moves relative the riser to maintain the system in operation. Therefore, a malfunction of the mechanisms providing for the transfer of the pressurized fluids can seriously compromise the integrity of the attachment of the marine riser to the offshore platform. The use of a piston and cylinder also requires use of seals which can wear and fail in service, resulting in extensive down time and expensive repair. The requirements for pressurized air or fluid also necessitates pumps and associated equipment be mounted on the floating platform, adding to the crowding already present on the platform.

Therefore, a need exists for an improved system capable of providing the desired constant tension in the lines connecting a marine riser to a floating platform and maintaining this tension as the line is payed out or taken in from the platform due to motion of the platform relative to the riser.

SUMMARY OF THE INVENTION

In accordance with one aspect of the present invention, a tensioner is disclosed for exerting a relatively constant predetermined tension on a line while permitting the line to travel a predetermined distance. The tensioner includes a frame and an elastomeric element. The elastomeric element has first and second ends and is resiliently deformable in torsion by rotating one of said ends relative the other end. Structure is provided for fixing the first end of the elastomeric element relative to the frame. Structure is provided for attaching the line to the second end so that as the line travels the predetermined distance, the second end of the elastomeric element rotates relative to the first end and the tensioning system exerts the relatively constant predetermined tension on the line.

In accordance with another aspect of the present invention, structure is provided to rotate the first end of the elastomeric element relative to the frame to deform the elastomeric element and exert the predetermined tension on the line.

BRIEF DESCRIPTION OF THE DRAWINGS

A more complete understanding of the invention and its advantages will be apparent from the following detailed description when taken in conjunction with the accompanying drawings in which.

Figure 6:
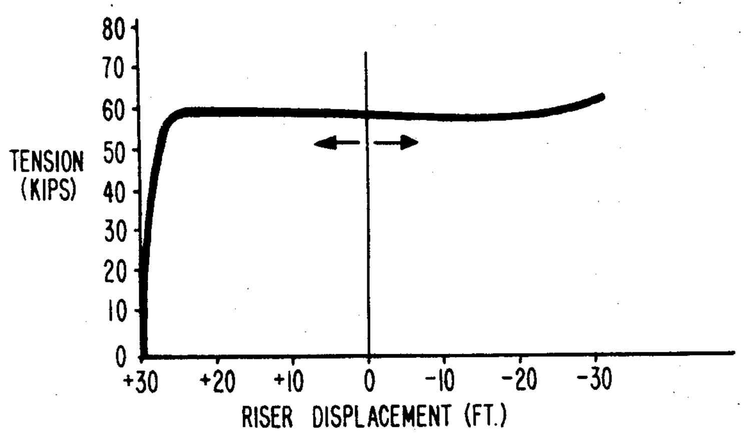

FIGS. *2a* and *2b* are illustrative views showing how each line is payed out or taken in by each tensioner as the riser moves relative to the floating platform;

FIG. 3 is a partial cross-sectional view of the tensioner illustrating the tapered drum and series mounted elastomeric members;

FIG. 4 is a partial cross-sectional view of an elastomeric member used in the tensioner shown in FIG. 3;

FIG. 5 is a partial cross-sectional view of an alternate elastomeric member that can be used in the tensioner of FIG. 3; and FIG. 6 is a graph showing the uniformity of tension exerted on the line by a tensioner as the marine riser moves relative to the floating platform.

DETAILED DESCRIPTION

Figure 1:
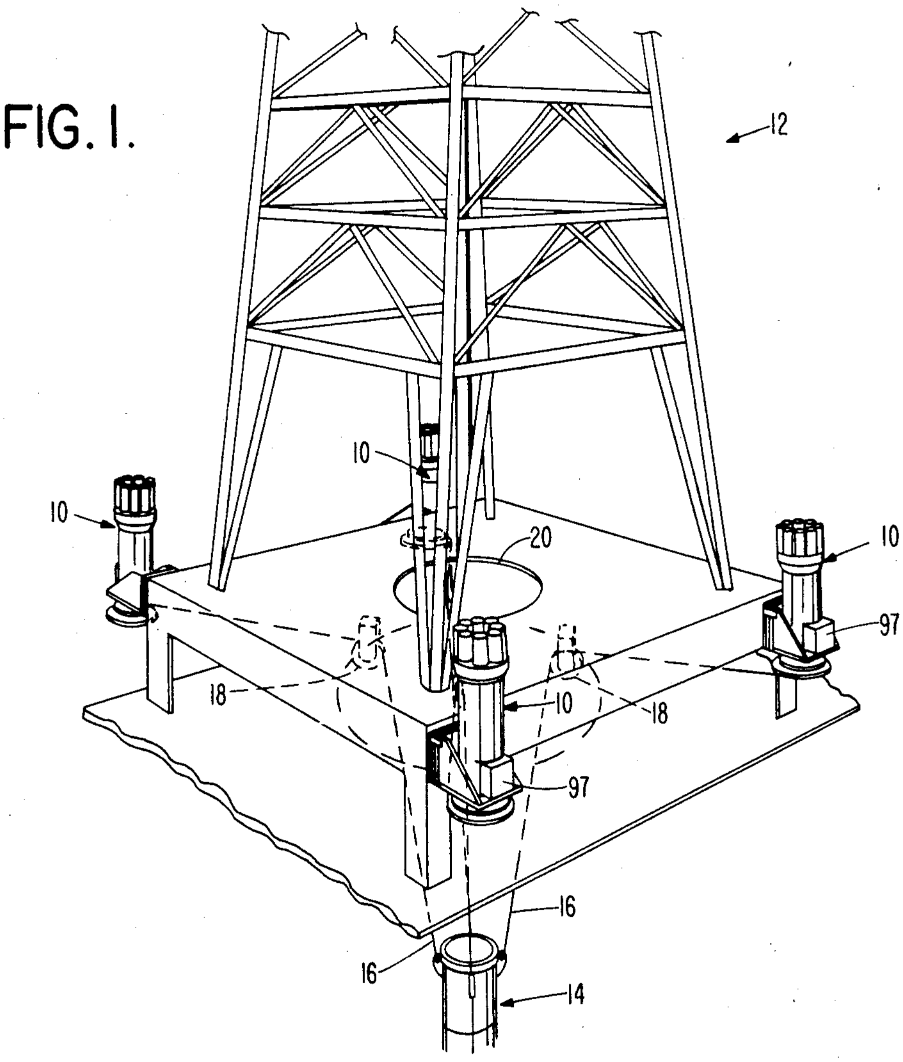
FIG. 1 is an illustrative view of a floating platform and a marine riser supported from the floating platform by various lines, illustrating a number of tensioners for maintaining a predetermined tension in the lines which form a first embodiment of the present invention.

Referring now to the drawings, wherein like reference characters designate like or corresponding parts throughout several views, a novel tensioner 10 is illustrated. With particular reference to FIG. 1, it can be seen that a plurality of tensioners 10 can be mounted on a floating platform 12. A marine riser 14 is supported from the floating platform 12 through a plurality of connecting lines 16. Each of the connecting lines 16 is associated with one tensioner 10 and each tensioner 10 acts to provide a constant predetermined tension in a line 16 while permitting the line 16 to be payed out and taken in to provide for freedom of movement of the floating platform 12 relative to the marine riser 14 caused by movement of the ocean surface. By the use of such tensioning systems, the floating platform 12 can support the marine riser 14 off the floor of the ocean while permitting significant vertical and horizontal movement of the floating platform relative to the marine riser. In normal operation, the platform can often move 30 feet in almost any direction from the initial set point between the platform and marine riser.

It will be seen in FIG. 1 that each tensioner 10 is oriented so that a turndown sheave 18 is associated with each line to allow the line to be generally horizontal between the sheave and each tensioner 10 while turning down vertically to the riser. While the tensioners 10 can clearly be oriented relative to the marine riser 14 so that a sheave 18 is not necessary, it is desirable to use the sheaves 18 to permit the tensioners 10 to be spaced from the aperture 20 in the platform 12 above the marine riser 14, which is often crowded with other equipment. The floating platform 12 can be used for either drilling or production operations.

With reference now to FIGS. 2-5, the tensioner 10 is shown in greater detail. The tensioner 10 can be seen to comprise a rigid frame 22 which is secured directly to the floating platform 12. The frame 22 can be seen to include a cylindrical portion 24.

At the bottom end 28 of the cylindrical portion 24, a tapered drum 30 is rotatably mounted to the portion 24 for rotation about an axis 34 coincident with the central axis of the cylindrical portion 24. With particular reference to FIGS. *2a*, *2b* and 3, the tapered drum 30 can be seen to have a helically tapered groove 36 which begins close to the axis 34 near the bottom end 28 of cylindrical portion 24 and moves radially outward from axis 34 and down away of the drum from end 28. The tapered drum 30 can be seen to also form a brake disk 38 outside cylindrical portion 24 and a platform 40 that lies within the cylindrical portion 24.

A first cylindrical elastomeric member 42 is secured at its lower end on the platform 40 by any suitable bonding or attachment technique. Member 42 extends along essentially the entire length of the cylindrical portion 24 and is centered on axis 34.

A shaft 44 extends along axis 34 and is threaded at both ends. A nut 45 is threaded at the upper end 52 of shaft 44. A nut 47 and lock nut 47' are threaded on the lower end of shaft 44 and bear against the bottom of a bearing 48. Bearing 48 facilitates relative rotation between shaft 44 and platform 40 about axis 34. Near the upper end of shaft 44, a platform 50 is supported on the shaft which permits the platform 50 to rotate about the axis 34 relative to the shaft 44 and slide along shaft 44 until it contacts nut 45. The upper end of the first elastomeric member 42 is fastened to platform 50 by a suitable joining technique. By adjusting nut 45 and/or nut 47, the elastomeric member 42 can be compressed between platforms 50 and 40 along axis 34 to increase the fatigue life of member 42. The shaft 44 will permit relative rotation between platforms 40 and 50 as member 42 is deformed in torsion. A dust cap 49 can be mounted to protect the upper portion of shaft 44.

A second cylindrical elastomeric member 54 surrounds the first elastomeric member 42 and is also centered on axis 34. The upper end of the cylindrical elastomeric member is also secured to the platform 50. The bottom end of elastomeric member 54 is secured to a platform 56. Platform 56, in turn, is rotatably mounted to the bottom end 28 through a bearing 58. Member 54 is preferably also compressed along axis 34 by the adjustment of nut 45 and/or nut 47 to increase fatigue life.

A third cylindrical elastomeric member 60 surrounds both the first and second elastomeric members and is also centered on the axis 34. The lower end of elastomeric member 60 is also secured to the platform 56. The upper end of elastomeric member 60 is secured to a ring 62 which is mounted at the upper end of cylindrical portion 24 for rotation about the axis 34. Member 60 is also preferably precompressed along axis 34 between platform 56 and ring 62 to increase fatigue life.

As can best be seen in FIG. 3, the inner surface ring of 62 is provided with teeth 64. The teeth 64 are engaged by a series of pinion gears 66 about its inner periphery with each of the pinion gears 66 forming part of a motor assembly 68. Each of the motor assemblies also includes a motor 70, a motor brake 72, a gear reducer 74 and. a drive shaft 76 extending from the gear reducer 74, on which is mounted the pinion gear 66. It will be readily understood that if the motor brake 72 of each motor assembly 68 is activated to prevent rotation of the associated drive shaft 76, the ring 62 will be fixed relative to the frame 22. Suitable electrical connections 78 are made to the motor assembly 68 so that the motors 70 can be rotated simultaneously at identical speed to rotate the ring 62 in either rotational direction about the axis 34. A guard 80 can be secured to the frame 22 to protect the motor assemblies 68.

If the motor brakes 72 are activated so that ring 62 is fixed relative to frame 22, rotation of the tapered drum 30 about the axis 34 will deform the elastomeric members 42, 54 and 60 in torsion. The elastomeric members can be seen to be positioned in a series relationship and are preferably designed so that a given torque exerted on the tapered drum 30 to rotate the drum 30 about the axis 34 will induce the equal angular deformation in each of the elastomeric members. It will be observed that the radial thickness of the elastomeric members decreases with radial distance from axis 34 to achieve this result. Furthermore it is preferable to maintain the shear in the elastomeric members equal so that wear is uniform. As the distance from the axis 34 increases and the lever arm increases also, less area is necessary in the elastomeric member to counteract a given torque, resulting in a decrease in thickness of the elastomeric members away from axis 34.

FIG. 4 illustrates a partial cross section of elastomeric member 42. The member 42 can be seen to comprise a series of rigid rings 86, each one of which forms a portion of a cone. Elastomeric elements 88 connect each of the rings 86 and are bonded by suitable techniques to the rings. It will be observed that a stress relieving contour 90 exists in each of the elastomeric elements 88 between rings 86 to resist the propagation of a tear in the elastomeric element.

FIG. 5 illustrates an alternate construction of the elastomeric members. In this alternate embodiment, a series of rings 92, each forming a portion of a cone, are fully embedded within an elastomeric body 94.

In the preferred embodiment, the elastomeric elements 88 are formed from a blended natural rubber and butadiene with a 60 to 70 durometer reading. In each elastomeric member, the thickness of the elastomeric elements is preferably 4 to 6 times that of the rigid rings 86. The rigid rings are intended to aid in the precompression of the elastomeric elements to enhance the fatigue life of the elastomeric elements.

In use, each connecting line 16 is attached at a first end to the marine riser 14. Each line 16 then passes over a turndown sheave 18 and the opposite end is secured to a tensioner 10 at the tapered drum near the radially outermost extent of the tapered groove 36.

To tension each line, the motors 70 on the tensioner 10 are then activated to rotate the ring 62 and take in the excess line by wrapping the line about the drum 30 in the groove 36. When the floating platform 12 is positioned in its ideal position relative to the marine riser 14, it is preferable to wrap enough line 16 about the drum to fill the radially outer half of the groove 36 before the predetermined tension is exerted through line 16.

Once the predetermined constant tension is achieved in a line 16 by rotation of the ring 62, the motors 70 are stopped. The motor brakes 72 are then activated to fix the ring 62 relative to the frame 22. Of course, if a different predetermined constant tension is desired, the motors 70 need only be activated to rotate ring 62 to create the new desired tension and the brakes 72 reset to hold the tension. This may be done, for example, if one of the tensioners 10 on platform 12 is removed and the remaining tensioners 10 are required to exert a higher tension on the remaining lines 16 to hold the user.

While any desired number of motor assembly 68 can be used, it is preferable to use a sufficient number so that the tooth load between the pinions and the teeth on the ring is reduced to an acceptable level for reliable operation. If a constant diameter drum were employed in place of tapered drum 30, as line was payed off the drum, the tension on the line would not be a constant force as the elastomeric members are further deformed in torsion. If line was taken in by such a drum, the tension on the line would likewise not be constant as the deformation in the elastic members decreases. However, the tapered drum 30 is designed so that the tapered groove 36 compensates for the variation in force exerted by the elastomeric members so that a relatively constant predetermined tension is always provided on the line 16 relatively independent of the deformation of the elastomer members. As additional line 16 is payed out from the tapered drum 30, the line will extend from the drum nearer the radially outermost extent of the drum as illustrated in FIG. 2*b* providing a longer lever arm between axis 34 and the point **82*b* where the line 16 separates from the groove to compensate for the increased torque necessary to deform the elastomeric members. As line 16 is taken in, the line will occupy more of the groove and the lever arm between the center axis 34 and point 82*a*** as seen in FIG. 2*a* will decrease to compensate for the decreased torque exerted by the elastomeric members. The tension on the line is therefore maintained relatively constant by varying the lever arm between the center axis 34 and the point from which the line extends from the groove 36 to compensate for the variations in torque exerted by the elastomeric members as they are placed in torsion. FIG. 6 illustrates a curve showing the tension in a line 16 exerted by a tensioner of the present invention which was developed to permit total movement of the connecting line of about 50 feet, 25 feet either way of the desired ideal set point.

As can be seen, the tensioner 10 provides a very effective technique for providing a predetermined tension on the connecting line 16 while permitting the line 16 to be payed out or taken in as the floating platform 12 moves relative to the marine riser 14. The tensioner 10 is also a passive system, in contrast to prior tensioning systems. In normal operation, the tensioning force is provided simply by the deformation of the elastic members and requires no outside energy input for continuous operation. In the prior art hydropneumatic tensioning systems, a continuous transfer of fluids is necessary to maintain the desired tension on the lines as the platform moves relative to the riser, and if the fluid transfer is interrupted, as by mechanical failure, the system will no longer function properly. In contrast, the tensioner of the present invention will continue operating, even if power is lost to the platform 12, providing significant operational advantages over the prior art design. In the present design, there is no need to replenish hydraulic fluid, charge the system with air or change the packings in the piston. This translates into reduced down time and lessened maintenance cost. The passivity of the present invention reduces the requirements for auxiliary equipment, such as hydraulic or air pumps and thus reduces the crowding on the floating platform significantly.

The tensioner 10 has an additional safety feature should a line 16 part. A load cell 96 is mounted on each tensioner 10 which senses line tension. Load cell 96 activates the brake system control network 97 should the line break. If the control network 97 is activated, a series of brake calipers 98 secured to frame 22 will be activated to clamp onto the brake disk 38 of the tapered drum 30. This will immediately stop any motion of the drum relative to the frame and prevent the loose broken line 16 from damaging equipment or injuring personnel.

Although only one embodiment of the present invention has been illustrated in the accompanying drawings and described in the foregoing detailed description, it will be understood that the invention is not limited to the embodiment disclosed, but is capable of numerous rearrangements, modifications and substitutions of parts and elements without departing from the scope and spirit of the invention.

We claim:

1. A tensioner for exerting a relatively constant predetermined tension on a line securing a marine riser to a floating platform while permitting the line to be payed out and taken in by the tensioner for a predetermined distance as the floating platform moves relative to the marine riser, comprising:

a frame mounted on the floating platform and including a cylindrical portion for rotation about the first axis, a tapered drum having a groove formed therein for receiving the line, the groove extending in an outward spiral away from the first axis from a first end of the groove, the line being secured at a first end to the drum near the radially outermost extent of the groove and being wrapped around the drum in the groove as the line is taken in so that the radial distance between the first axis and the position where the line extends out of the groove decreases as the line is taken in on the drum, the second end of the line being secured to the marine riser;

an elastomeric element having a first and second end and being resiliently deformable in torsion about a torsional axis by rotating one of said ends relative the other end, said elastomeric element being comprised of first, second and third cylindrical elastomeric members, said frame providing a first platform rotatably mounted on the cylindrical portion near the first end for rotation about the first axis and a second platform mounted for rotational motion about the first axis at the opposite end of the cylindrical portion, the first cylindrical elastomeric member being secured at a first end to the drum and at its second end to the second platform, the second cylindrical elastomeric member being secured at a first end to the second platform and and at its second end to the first platform, the third cylindrical elastomeric member being fixed at its first end to the first platform and at its second end to the ring gear, the first, second and third elastomeric members thereby being positioned in series;

means for fixing the first end of the elastomeric element relative to the frame, the second end of the element being fixed to the drum for joint rotation therewith about the first axis, the torsional axis of the elastomeric element coinciding with the first axis;

the outward spiral of the groove being designed so that as the line is payed out and taken in, the predetermined tension on the line acting through the varying moment arm between the first axis and the point where the line leaves the groove compensates for variation in the moment exerted as the elastomeric element is deformed in torsion to maintain the predetermined tension on the line; a ring gear mounted on the cylindrical portion at the end of the cylindrical portion opposite the first end for rotation about the first axis, the first end of the elastomeric member being fixed to the ring gear, said ring gear having a ring of gear teeth; and at least one motor assembly mounted on the frame, said motor assembly comprising a motor having a drive shaft, a pinion mounted on said drive shaft for joint rotation therewith, the teeth of the pinion engaging the teeth on the ring gear, and a motor brake for preventing rotation of the motor shaft, the motor being operable to rotate the ring gear about the first axis to place the elastomeric element in torsion to exert the predetermined tension on the line, the motor then being stopped and the motor brake being applied to prevent rotation of the ring gear.

2. The tensioner of claim 1 wherein the first elastomeric member is nested within the second elastomeric member which is nested within the third elastomeric member, the thickness of the elastomeric members decreasing in the radial direction away from the first axis so that the angular deflection of each of the members is equal as a given moment is applied on the drum.

3. The tensioner of claim 1 wherein each of the elastomeric members is comprised of elastomeric materials separated by conical rigid rings.

4. The tensioner of claim 1 wherein said drum has a brake disk mounted thereon, said frame having at least one brake caliper mounted thereon for stopping motion of the drum.

5. A tensioner for exerting a relatively constant predetermined tension on a line securing a marine riser to a floating platform while permitting the line to be payed out and taken in from the tensioner for a predetermined length as the floating platform moves relative to the marine riser, comprising:

a frame mounted on the floating platform and including a cylindrical portion having a first end and a second end, the frame further mounting a first platform at the first end for rotation about a first axis and a second platform at the second end for rotation about the first axis and a ring member at the second end for rotation about the first axis with the ring member having a series of teeth on the inside periphery thereof;

a tapered drum rotatably mounted at the first end of the cylindrical portion for rotation about the first axis, the tapered drum having a spiral groove formed therein which spirals radially outward from the first axis for receiving the line, the line being attached near the radially outermost portion of the groove and being payed out and taken in along the groove of the drum by rotating the drum about the first axis;

a first cylindrical elastomeric member centered on the first axis within the cylindrical portion and being deformable in torsion about the first axis, the elastomeric member having a first end fixed to the tapered drum and a second end fixed to the second platform;

a second cylindrical elastomeric member centered on the first axis within the cylindrical portion concentric with the first elastomeric member, the second cylindrical elastomeric member being deformable in torsion about the first axis, a first end of the second elastomeric member being fixed to the second platform and a second end being fixed to the first platform;

a third cylindrical elastomeric member centered on the first axis within the cylindrical portion and being deformable in torsion about the first axis and being concentric to the first and second elastomeric members, a first end of the third elastomeric member being fixed to the first platform and a second end being fixed to the ring member;

at least one motor assembly mounted on said frame and having a motor for rotating a drive shaft in a desired direction, a pinion mounted for rotation with the drive shaft having teeth engaging the gear teeth on the ring gear and a motor brake for preventing motion of the drive shaft of the motor;

the motor being activated to deform the first; second and third elastomeric members in torsion to rotate the tapered drum and tension the line to the predetermined tension, the motor brake subsequently fixing the ring gear relative to the frame, the radial distance between the first axis and the position the line leaves the groove in the tapered drum varying as the tapered drum rotates about the first axis to pay out and take in the line to compensate for the variation in torsional moment exerted by the elastomeric members in torsional deformation so that the line remains tensioned as the predetermined tension.

6. The tensioner of claim 5 wherein the thickness of the elastomeric members decreases with radial distance from the first axis so that the angular deflection of each of the elastomeric members is equal as a torsional moment is applied to deform the elastomeric members.

7. The tensioner of claim 5, further having a brake mechanism to brake the tapered drum relative to the frame to prevent uncontrolled rotation of the tapered drum if the line fails, said brake mechanism comprising:

a brake disk mounted on said drum:

at least one brake caliper mounted on said frame for engaging said brake drum and for stopping rotational motion of said drum when so engaged:

a brake mechanism control network for controlling said brake mechanism; and a load cell for sensing line tension and activating said brake mechanism control network should the line brake.

8. A method for exerting a relatively costant predetermined tension on a line used to secure a marine riser to a floating platform while permitting the line to travel a predetermined distance, permitting the line to be payed out and taken in as the floating platform moves relative to the marine riser while supporting the marine riser, comprising the steps of:

securing a first end of said line to a tapered drum, the tapered drum being mounted on a frame for rotational motion relative the frame about a first axis, the frame being secured on the floating platform;

securing the opposite end of the line to the marine user;

tensioning the line to the predetermined tension by rotating the tapered drum to take in the line onto the tapered drum, the line being received in a groove on the tapered drum extending spirally toward the first axis, the tapered drum being rotated by rotating a first end of an elastomeric element about the first axis, a second end of the elastomeric element being secured to the tapered drum;

securing the first end of the elastomeric element relative to the frame, deformation in the elastomeric element maintaining the predetermined tension in the line, the line being taken in and payed out from the tapered drum by rotation of the tapered drum about the first axis as the floating platform moves relative the marine riser, the radial distance between the first axis and the point where the line leaves the drum varying as the line is payed out and taken in to compensate for variation in the moment exerted by deformation of the elastomeric element to maintain the predetermined tension in the line.

* * * * *